(12) United States Patent
Newman et al.

(10) Patent No.: US 11,284,163 B2
(45) Date of Patent: Mar. 22, 2022

(54) UNIVERSAL BROWSE AND WATCH LIST

(71) Applicant: Apple Inc., Cupertino, CA (US)

(72) Inventors: Lucas C. Newman, San Francisco, CA (US); Derek A. Hunter, Aptos, CA (US); Sandip M. Chokshi, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/915,518

(22) Filed: Jun. 29, 2020

(65) Prior Publication Data

US 2020/0329279 A1 Oct. 15, 2020

Related U.S. Application Data

(63) Continuation of application No. 16/112,167, filed on Aug. 24, 2018, now Pat. No. 10,701,452, which is a continuation of application No. 15/249,246, filed on Aug. 26, 2016, now Pat. No. 10,070,193.

(51) Int. Cl.
| | |
|---|---|
| *H04N 5/445* | (2011.01) |
| *H04N 21/482* | (2011.01) |
| *H04N 21/466* | (2011.01) |
| *H04N 21/44* | (2011.01) |
| *H04N 21/472* | (2011.01) |
| *H04N 21/442* | (2011.01) |
| *H04N 21/462* | (2011.01) |
| *H04N 21/81* | (2011.01) |
| *H04N 21/2668* | (2011.01) |

(52) U.S. Cl.
CPC ......... *H04N 21/4826* (2013.01); *H04N 21/44* (2013.01); *H04N 21/44204* (2013.01); *H04N 21/44209* (2013.01); *H04N 21/4622* (2013.01); *H04N 21/4668* (2013.01); *H04N 21/47217* (2013.01); *H04N 21/4828* (2013.01); *H04N 21/812* (2013.01); *H04N 21/2668* (2013.01)

(58) Field of Classification Search
CPC ......... H04N 21/4826; H04N 21/44204; H04N 21/812; H04N 21/4622; H04N 21/44209; H04N 21/4828; H04N 21/47217; H04N 21/44; H04N 21/4668; H04N 21/2668
See application file for complete search history.

(56) References Cited

U.S. PATENT DOCUMENTS

| | | | |
|---|---|---|---|
| 6,002,394 A * | 12/1999 | Schein | H04N 21/26266 725/39 |
| 6,177,931 B1 * | 1/2001 | Alexander | H04N 21/44222 725/52 |
| 7,765,235 B2 | 7/2010 | Day et al. | |
| 7,774,811 B2 | 8/2010 | Poslinski et al. | |
| 7,992,161 B2 | 8/2011 | Meadows et al. | |
| 8,141,111 B2 | 3/2012 | Gilley et al. | |
| 8,260,930 B2 | 9/2012 | Khan et al. | |
| 8,270,920 B2 | 9/2012 | Chan et al. | |
| 8,291,453 B2 | 10/2012 | Boortz | |
| 8,291,461 B2 | 10/2012 | Thomas et al. | |
| 8,582,946 B2 | 11/2013 | Craner | |

(Continued)

*Primary Examiner* — Michael B. Pierorazio
(74) *Attorney, Agent, or Firm* — Fletcher Yoder, P.C.

(57) ABSTRACT

The systems described herein provide a system for automatic login into content provider applications. An operating system stores authentication credentials for the applications, which can be subsequently provided for use during invocation of the content provider applications.

20 Claims, 9 Drawing Sheets

(56) References Cited

U.S. PATENT DOCUMENTS

| | | |
|---|---|---|
| 8,584,171 B2 | 11/2013 | Brownrigg et al. |
| 8,656,431 B2 | 2/2014 | Cavicchia |
| 8,713,603 B2 | 4/2014 | Kilar et al. |
| 8,719,879 B2 | 5/2014 | Youssefmir et al. |
| 8,875,171 B2 | 10/2014 | Sandoval |
| 8,949,410 B2 | 2/2015 | Patel et al. |
| 8,955,030 B2 | 2/2015 | Heie et al. |
| 9,071,799 B2 | 6/2015 | Pattison et al. |
| 9,100,683 B2 | 8/2015 | Bhogal et al. |
| 9,152,300 B2 | 10/2015 | Poniatowski |
| 9,154,721 B2 | 10/2015 | Gratton |
| 9,229,734 B2 | 1/2016 | Hulse et al. |
| 9,507,785 B2 | 11/2016 | Kandekar et al. |
| 10,070,193 B2* | 9/2018 | Newman .......... H04N 21/44204 |
| 2002/0174430 A1* | 11/2002 | Ellis ................... G11B 27/034 |
| | | 725/46 |
| 2003/0120541 A1* | 6/2003 | Siann ................ G06Q 30/0267 |
| | | 705/14.47 |
| 2003/0149618 A1* | 8/2003 | Sender ............... G06Q 30/0257 |
| | | 705/14.55 |
| 2003/0149975 A1* | 8/2003 | Eldering ............ H04N 21/812 |
| | | 725/34 |
| 2004/0255322 A1* | 12/2004 | Meadows .......... H04N 21/4722 |
| | | 725/23 |
| 2005/0132398 A1* | 6/2005 | Baran ............. H04N 21/25435 |
| | | 725/28 |
| 2006/0048184 A1* | 3/2006 | Poslinski ............... H04N 7/163 |
| | | 725/45 |
| 2006/0253417 A1* | 11/2006 | Brownrigg ........... G06F 16/44 |
| 2007/0104456 A1* | 5/2007 | Craner ............. H04N 21/4882 |
| | | 386/291 |
| 2007/0174336 A1* | 7/2007 | Day ................... H04N 21/8545 |
| 2008/0022298 A1* | 1/2008 | Cavicchia ........... H04N 21/482 |
| | | 725/25 |
| 2008/0115161 A1* | 5/2008 | Kurzion ................ G06Q 30/02 |
| | | 725/32 |
| 2008/0187279 A1* | 8/2008 | Gilley ................ H04N 21/2543 |
| | | 386/250 |
| 2008/0221986 A1* | 9/2008 | Soicher .............. G06Q 30/0258 |
| | | 705/14.36 |
| 2008/0235587 A1* | 9/2008 | Heie ..................... H04N 7/142 |
| | | 715/719 |
| 2008/0235733 A1* | 9/2008 | Heie ................. H04N 7/17318 |
| | | 725/46 |
| 2008/0271078 A1* | 10/2008 | Gossweiler ........ H04N 5/44543 |
| | | 725/40 |
| 2009/0217316 A1* | 8/2009 | Gupta .................. H04L 65/607 |
| | | 725/32 |
| 2009/0304361 A1* | 12/2009 | Chan ................... H04N 21/4305 |
| | | 386/357 |
| 2009/0310937 A1* | 12/2009 | Ellis ................... H04N 21/4334 |
| | | 386/291 |
| 2010/0031162 A1* | 2/2010 | Wiser .................... H04N 21/431 |
| | | 715/747 |
| 2010/0186025 A1* | 7/2010 | Thomas ........... H04N 21/25875 |
| | | 725/5 |
| 2010/0247067 A1* | 9/2010 | Gratton .............. H04N 21/4334 |
| | | 386/291 |
| 2011/0047569 A1* | 2/2011 | Mears ................. H04N 5/4401 |
| | | 725/39 |
| 2011/0138053 A1* | 6/2011 | Khan ................... H04L 67/1002 |
| | | 709/226 |
| 2011/0179453 A1* | 7/2011 | Poniatowski ...... H04N 21/4622 |
| | | 725/58 |
| 2011/0307929 A1* | 12/2011 | Youssefmir ...... H04N 21/23805 |
| | | 725/89 |
| 2012/0066371 A1* | 3/2012 | Patel .................... H04L 67/1031 |
| | | 709/224 |
| 2012/0110620 A1* | 5/2012 | Kilar ..................... H04N 21/812 |
| | | 725/34 |
| 2012/0117339 A1* | 5/2012 | Kandekar ............ G06F 16/113 |
| | | 711/159 |
| 2012/0284745 A1* | 11/2012 | Strong .................. G06Q 30/02 |
| | | 725/34 |
| 2013/0133009 A1* | 5/2013 | Bhogal ................ H04N 21/472 |
| | | 725/58 |
| 2013/0139196 A1* | 5/2013 | Sokolov ........... H04N 21/25833 |
| | | 725/25 |
| 2013/0219435 A1* | 8/2013 | Pattison ............. H04N 21/6143 |
| | | 725/68 |
| 2013/0346478 A1 | 12/2013 | Rodriguez et al. |
| 2016/0301964 A1* | 10/2016 | Laliberte ........... G06Q 30/0207 |
| 2016/0323643 A1* | 11/2016 | Panchaksharaiah ........................ H04N 21/4753 |

\* cited by examiner

UNIVERSAL BROWSE AND WATCH LIST

CROSS-REFERENCE TO RELATED APPLICATIONS

This application is a continuation of U.S. application Ser. No. 16/112,167, filed Aug. 24, 2018, entitled "UNIVERSAL BROWSE AND WATCH LIST," which is a continuation of U.S. application Ser. No. 15/249,246 filed Aug. 26, 2016, entitled "UNIVERSAL BROWSE AND WATCH LIST," the content of which is incorporated herein by reference in its entirety.

TECHNICAL FIELD

The disclosure generally relates to providing playback of media items on computing devices.

BACKGROUND

Many modern computing devices provide features that allow user to consume streaming media. For example, a smartphone, laptop, or set top box can be configured with applications from various content providers that a user can invoke to view content provided by a respective content provider server. When the user wishes to view a particular content item (e.g., movie, television show, etc.), the user can invoke each content provider application, search or browse for the content item, and watch the content item, if provided by the content provider. For example, the user can invoke content provider's application to see what the user previously watched, get recommendations for new content, resume viewing content that the user partially watched, or resume a series of content (e.g., the next episode in a TV series).

However, the process of finding the content item by invoking several different content provider applications can be time consuming, burdensome, and costly to the user if the user does not know that the content item is provided for free on one service and for a fee on another service. Moreover, the user may forget that the user accessed a content item from one provider and not another and waste time trying to continue watching the content item by attempting to find the content item through a content provider that does not have the desired content item. Thus, an improved mechanism for allowing a user to search, browse, and/or continue watching content items from various content providers is needed.

SUMMARY

The systems described herein include a universal browse and watch list that can provide a centralized user interface for presenting recently watched, recommended, and continue watching content items provided by different content providers. For example, a media device can include multiple content provider applications for viewing media items on the media device. When a content provider application presents a media item, the content provider application can send playback status data to a content aggregator application on the media device. The content aggregator application can provide the playback status data to a content aggregator server. The content aggregator application can interact with a content aggregator server to determine which content providers can provide the played media item or related media items. The content aggregator application can provide a centralized user interface that allows the user to initiate playback of media items provided by the various content providers.

Particular implementations may provide at least the following advantages, which are not a required feature of any embodiment. The user of the media device can select media content item for playback in a single application regardless of content source. In addition, the content played by the media device does not have to come from the same content source or vendor that previously provided the content item. The media device can be configured to determine the best media content provider with the best content item (e.g., the highest quality, no advertisement, and the cheapest, etc.) for playback from the corresponding source and invoke the corresponding media content provider applications without additional input from the user.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Examples of a method, apparatus, and computer program for providing the universal browse and watch list are disclosed below. In the following description, for the purposes of providing explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
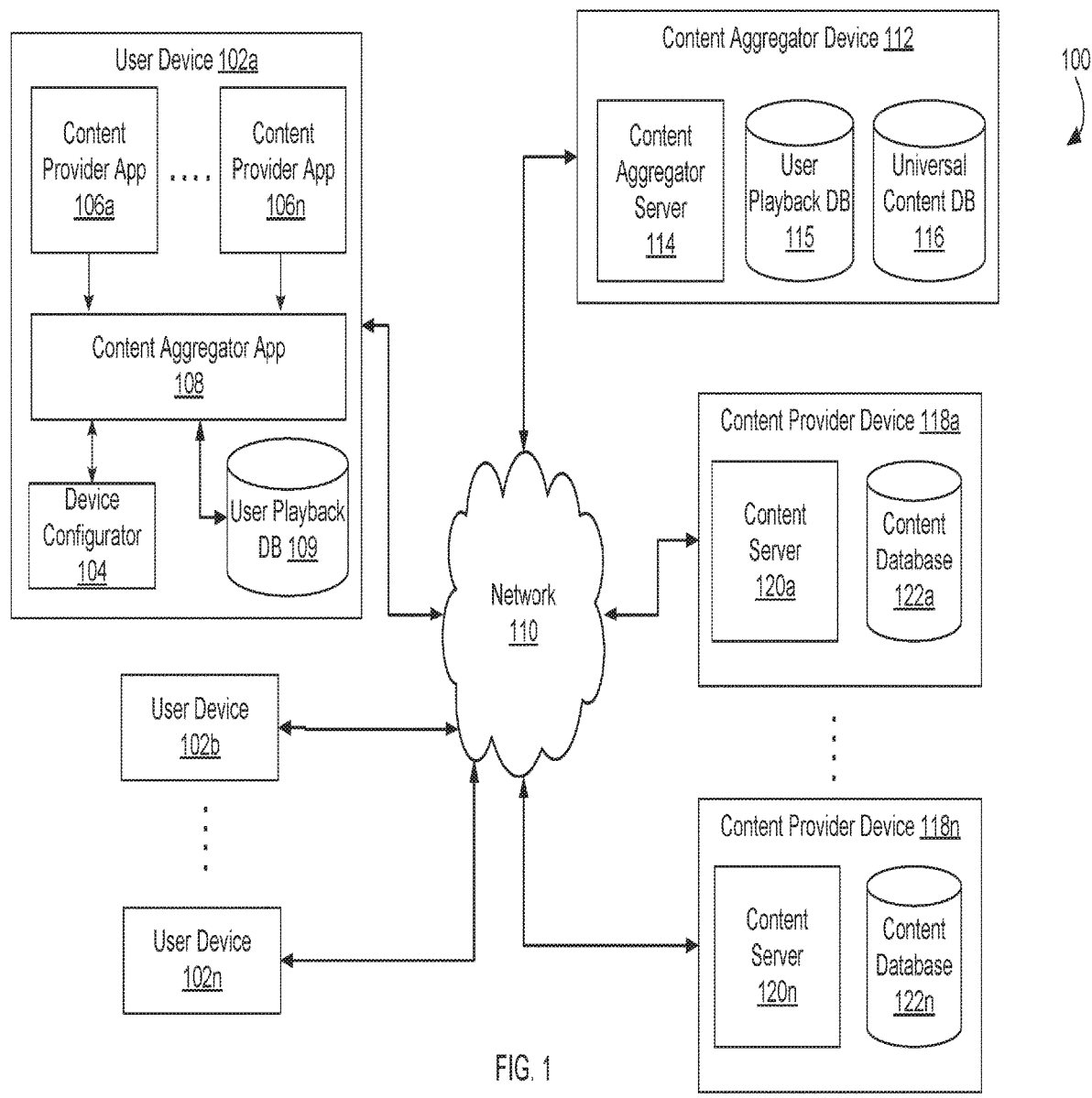
FIG. 1 is a block diagram of an example system for providing a universal browse and watch list.

FIG. 1 is a block diagram of an example system 100 for providing a universal browse and watch list. For example, system 100 can include user device 102a. User device 102a can be configured to present media content, including movies, TV shows, music, photos, podcasts and websites, video, and to provide an interface with a menu structure that facilitates the navigation and selection of media item choices. For example, user device 102a can be a computing device, such as a television, media streaming device, set top box, desktop computer, laptop computer, smartphone, tablet computer, household device, electronic book device, game device, smart watch, smart glasses and/or other mobile or wearable device, the accessories and peripherals of these devices, or any combination thereof.

In some implementations, the device configurator 104 can configure different hardware and software applications that provide a variety of services and features for the user of user device 102a. For example, device configurator 104 can receive user input specifying various settings for the applications installed on user device 102a. The settings can include language settings, display settings, and the like. The settings can include account subscription information for the various applications installed on user device 102a. For example, the user of user device 102a may have a subscription to one or more content providers associated with the applications installed on user device 102a. Device configurator 104 can collect the subscription account information (e.g., account identifier, password, access tokens, etc.) from the user and store the subscription information on user device 102a. When the user later invokes a content provider application (e.g., content provider application A 106a), the content provider application can obtain the subscription account information from device configurator 104 and automatically login to the content provider's server (e.g., website, online service, etc.) so that the user can view media content without having to input or provide the user's subscription account information every time the application is invoked. In some implementations, device configurator 104 can provide information to other applications (e.g., content aggregator application 108) describing the user subscriptions configured on user device 102a.

In some implementations, user device 102a can include various content provider applications 106a-106n. For example, the user device 102a can include multiple content provider applications 106a-106n for viewing media content items from different content providers on user device 102a. For example, the user can invoke content provider's application (e.g., content provider application 106a) to see what the user previously watched, get recommendations for new content, resume viewing content that the user partially watched, or resume a series of content (e.g., the next episode in a TV series). If the content provider requires a subscription or fee, the user can purchase the subscription and/or pay the fee and provide the user's subscription account identifier and password to device configurator 104, as described above. When the corresponding content provider application is invoked by the user (or another application), the content provider application can obtain the subscriber account information (e.g., account identifier, password, etc.) from device configurator 104 and automatically log the user in to the subscriber account at the content provider server.

Since user device 102a has several different content provider applications 106a-106n, the user may have to invoke several different content provider applications to find content (e.g., media items) that the user wishes to watch, listen to, or otherwise consume. For example, one content provider (e.g., corresponding to content provider application 106a) may have a license to provide a particular movie while another content provider (e.g., corresponding to content provider application 106n) may not have a license to provide the particular move. Similarly, a television show provided by one content provider application may not be available on another content provider application. Thus, the user may be required to invoke and close several content provider applications before finding the content that the user wishes to consume. However, user device 102a can be configured with content aggregator application 108 that provides a single user interface and/or single application for continuing, browsing, and/or searching for content items provided by various different content providers, as described herein.

In some implementations, user device 102a can include a content aggregator application 108. For example, content aggregator application 108 can receive watch status information from the various content provider applications 106a-106n and provide a central or single GUI by device configurator 104 for presenting recently watched, recommended, continue watching content items from different content sources and/or content providers. For example, content aggregator application 108 can be a standalone application installed on user device 102a. Content aggregator application 108 can be an application, function, utility, daemon, etc., that is built into or as part of the operating system of user device 102a.

In some implementations, the content aggregator application 108 can receive the playback status data corresponding to media items (e.g., movies, TV shows) provided by various content providers (e.g., iTunes, HBO®, Netflix) and presented by their applications 106a-106n on user device 102a. For example, when the user wishes to view a particular content item (e.g., movie, television show, etc.), the user can invoke each content provider application (e.g., 106a-106n), search or browse for the content item, and watch the content item, if provided by the content provider. As the content provider application plays a selected media item, the content provider application can send playback status data to content aggregator application 108. The playback status data can include, for example, a content provider identifier, a content provider specific identifier for the media item, media item metadata (e.g., title, artist, genre, etc.), current playback position, and/or other data describing the media item, content provider, and/or current playback position. The content provider application can send the playback status data periodically during playback. The content provider application can send the playback status data when various events occur during playback. For example, the events can include stopping playback, pausing playback, closing or exiting the content provider application, and/or reaching the end of a media item.

In some implementations, content aggregator application 108 can send the playback status data to the content aggregator device 112. For example, content aggregator application 108 can send the playback status data received from content provider applications 106a-106n to content aggregator server 114 on content aggregator device 112 through network 110. Content aggregator application 108 can send a device identifier for user device 102a and/or a user identifier (e.g., an email address, user name, account identifier, etc.) associated with the user of user device 102a to content aggregator server 114 along with the playback status data. In some implementations, content aggregator application 108 can store playback status data in user playback database 109 on user device 102a. For example, the playback status data can be stored in association with a user account associated with the user of user device 102a. The playback status data can be stored in association with a device identifier that identifies user device 102a.

In some implementations, content aggregator server 114 can store the playback status data in user content database 115. For example, content aggregator server 114 can store the playback status data in user content database 115 in association with a user identifier for the user of user device 102a. Content aggregator server 114 can store the playback status data in user content database 115 in association with a device identifier for user device 102a. The playback status data stored in user content database 115 can be received by content aggregator server 114 from multiple user devices (e.g., user device 102a, user device 102b, user device 102n). For example, the user of user device 102a may have multiple devices that the user uses to watch media items. Each user device can report playback status data to content aggregator server 114 and content aggregator server 114 can store the playback status data in user content database 115. Thus, content aggregator server 114 can determine based on the playback status data in universal content database 116 what media items the user has watched, what media items the user stopped in the middle of and would like to continue watching, and/or what media items the user may like to watch in the future based on the historical playback status data received from various user devices as stored in user content database 115.

In some implementations, content aggregator server 114 can receive media item metadata from various content providers. For example, content provider device 118a can include content server 120a configured to stream media items stored in content database 122a to content provider application 106a on user device 102a. In addition to storing the media items provided by the content provider operating content provider device 118a, content database 122a can store metadata describing each media item available from the corresponding content provider. For example, the content provider metadata can include a media item identifier, a representative image for the media item, the length of the media item, a cost (e.g., rental or purchase cost) associated with the media item, the quality of the media item (e.g., high definition, low definition, bit rate, etc.), artists or actors associated with the media item, a genre or category for the media item, and/or any other metadata typically associated with movies, television shows, radio shows, music, etc. Content server 120a can be configured to send media item metadata for each media item in content database 122a to content aggregator server 114. Content aggregator server 114 can receive the media item metadata from content provider device 118a and store the metadata in universal content database 116. For example, universal content database 116 can be a catalogue of media items and media item metadata provided by or available through the various content providers that have content provider applications that can be installed on user device 102a.

Similarly, content aggregator server 114 can receive media item metadata from content server 120n on content provider device 118n. For example, content provider device 118n can be operated by a different content provider than content provider device 118a. Content server 120n can send the media item metadata stored in content database 122n to content aggregator server 114. Content aggregator server 114 can store the received media item metadata in universal content database 116. Thus, universal content database 116 can store metadata representing each media item provided by content provider device 118a and content provider device 118n.

In some implementations, content aggregator server 114 can dynamically build universal content database 116 from playback status data reported by various user devices. For example, universal content database 116 can include media item records for each media item reported to content aggregator server 114 in playback status data by content aggregator applications on user device 102a, user device 102b, and/or user device 102n. Since content aggregator server 114 receives playback status data from so many different devices describing media items provided by various content providers, content aggregator server 114 can use the reported playback status data to build universal content database 116 that identifies the media items provided by or available from each of the different content providers.

In some implementations, content aggregator application 108 can present representations of media items from different content providers. For example, when a user invokes content aggregator application 108, content aggregator application 108 can send a request to content aggregator server 114 for media items to represent on a graphical user interface of content aggregator application 108. Each request can include, for example, a description of active subscriptions that the user has configured on user device 102a. For example, content aggregator application 108 can determine which content providers the user has subscribed to by requesting subscription information from device configurator 104.

In some implementations, content aggregator application 108 can request media items for a universal watch list. For example, the universal watch list can include media items that the user has previously watched and might want to continue watching. For example, content aggregator application 108 can send a request that includes a user identifier (e.g., an email address, user name, etc.), a device identifier for user device 102a, and subscription information identifying the content providers with which the user has a subscription. Upon receiving the request, content aggregator server 114 can determine media items that the user may want to continue watching based on the playback status data stored in user playback database 115. For example, if user playback database 115 includes playback status data that indicates the user has partially watched a media item or a series of media items, then content aggregator server 114 can search universal content database 116 for content provider metadata corresponding to the partially watched media item or the next media item in the series of media items. Content aggregator server 114 can filter the search results or select content items from the search results based on a variety of criteria (e.g., subscriptions, prepaid services, pre-purchased items, free-services, etc.), as described further below.

In some implementations, content aggregator application 108 can request media items for a universal browse list. For example, the universal browse list can include recommended media items that the user might want to watch but has not recently watched. For example, content aggregator application 108 can send a request that includes a user identifier (e.g., an email address, user name, etc.), a device identifier for user device 102a, and subscription information identifying the content providers with which the user has a subscription. Upon receiving the request, content aggregator server 114 can determine media items that the user may want to watch based on the playback status data store in user playback database 115. For example, the media items (e.g., media item identifiers, genres, etc.) in user playback database can be used by content aggregator server 114 to determine which media items in universal content database 116 the user might enjoy watching. For example, if the playback status data in user playback database 115 includes mostly action and science fiction movies, then content aggregator server 114 can search universal content database 116 for movies and television shows in the action and science fiction genres. In response to the search, content aggregator server 114 can receive content provider metadata for media items in the action and science fiction genres. Content aggregator server 114 can filter the search results or select content items from the search results based on a variety of criteria (e.g., subscriptions, prepaid services, pre-purchased items, free services, etc.), as described further below.

In some implementations, content aggregator application 108 can request a user specified search. For example, the user can enter characters for a media item search query into a graphical user interface provided by content aggregator application 108. For example, content aggregator application 108 can send a request that includes a user identifier (e.g., an email address, user name, etc.), a device identifier for user device 102a, subscription information identifying the content providers with which the user has a subscription, and the search string entered by the user. Content aggregator application 108 can send the search request to content aggregator server 114. Content aggregator server 114 can query universal content database using the search string and receive content provider metadata corresponding to media items that match the search string. Content aggregator server 114 can filter the search results or select content items from the search results based on a variety of criteria (e.g., subscriptions, prepaid services, pre-purchased items, free services, etc.), as described further below.

In some implementations, the content aggregator server 114 can select a media item and/or media content provider for subsequent playback of the media item based on a variety of selection criteria. For example, when content aggregator server 114 receives content provider metadata in response to the queries or searches described above, content aggregator server 114 may receive content provider metadata that indicates a particular media item is available from several different content providers. Content aggregator server 114 may find multiple media items from multiple different content providers that are related (e.g., match, correspond to, etc.) the particular media item. For example, multiple different content providers may provide access to the same media item and universal content database 116 may have multiple entries (e.g., records) for the same content item but associated with different content providers. Content aggregator application 108 can then select a content provider for presenting a media item based on various criteria, such as, price, quality, existing subscription, amount of advertisements, etc.

In some implementations, content aggregator server 114 can select a content provider for a media item based on primary selection criteria. For example, the primary selection criteria can include the cost of playing the media item provided by a content provider. For example, content aggregator application 108 can be configured to prefer content providers that provide the media item for free over content providers that charge a fee for presenting the media item. Content aggregator application 108 can be configured to prefer content providers that provide the media item for the least cost over content providers that charge a greater fee for presenting the media item. If the user already has a subscription to a content provider (e.g., has already paid a subscription fee), then content aggregator application 108 can treat the media items provided by the content provider providing the subscription service as free media items. For example, content aggregator application 108 can obtain information describing content providers to which the user has subscribed from device configurator 104 and provide the subscription information to content aggregator server 114, as described above. If the cost of obtaining a content item from two different content providers is the same, content aggregator application can select the media item (and corresponding content provider) based on secondary criteria. For example, the secondary criteria can specify that the content aggregator server 114 should select a content provider that provides the best quality media item (e.g., high definition video, high quality sound, etc.), fewest advertisements, in-app content provider subscriptions, etc.

Figure 2:
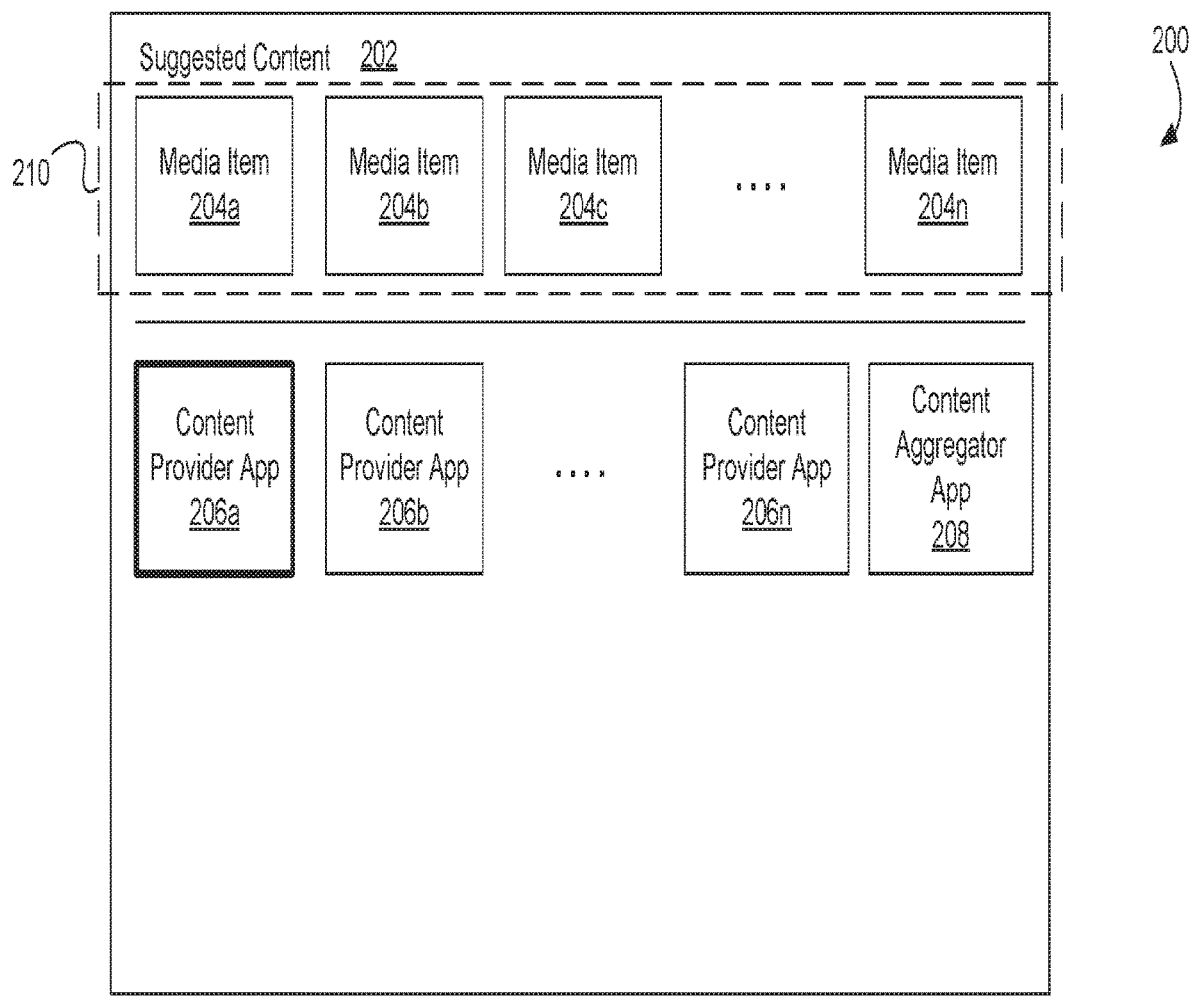
FIG. 2 illustrates an example graphical user interface for browsing content provider applications.

FIG. 2 illustrates an example graphical user interface 200 for browsing content provider applications. For example, graphical user interface (GUI) 200 can be a home screen, navigational menu, or application selection user interface. GUI 200 can present graphical representations of content provider applications and/or system applications that are installed or available for selection on user device 102a. For example, GUI 200 can include graphical elements (e.g., 206a-206n) representing content provider applications 106a-106n, respectively. For example, graphical element 206a can be an image, icon, or other graphical objects for invoking content provider application 106a. A user can, for example, select a graphical element 206a to invoke the corresponding content provider application 106a.

In some implementations, GUI 200 can present a preview of media items provided by a content provider or content provider application. For example, a user can select or highlight a representation of a content provider application (e.g., 206a) using a remote control or other input device (e.g., a touch sensitive display) to cause the corresponding content provider application to present representations of media items 204a-204n in area 202. As depicted in FIG. 2, the user has manipulated the remote control to place the focus on graphical element 206a representing content provider application 106a, and preview area 210 shows representations of media items 204a-204n provided by the content provider corresponding to content provider application 106a. If at this point the user were to select one of the preview content items (e.g., content item 204a), for example, by clicking a button on the remote control, user device 102a would respond by playing the content item for the user. For example, user device 102a can invoke content provider application 106a to play content item 204a since content item 204a is associated with content provider application 106a represented by graphical element 206a. Alternatively, when the user wishes to view a particular content item (e.g., movie, television show, etc.), the user can invoke a content provider application and select the content item from a menu or user interface provided by the content provider application.

Figure 3:
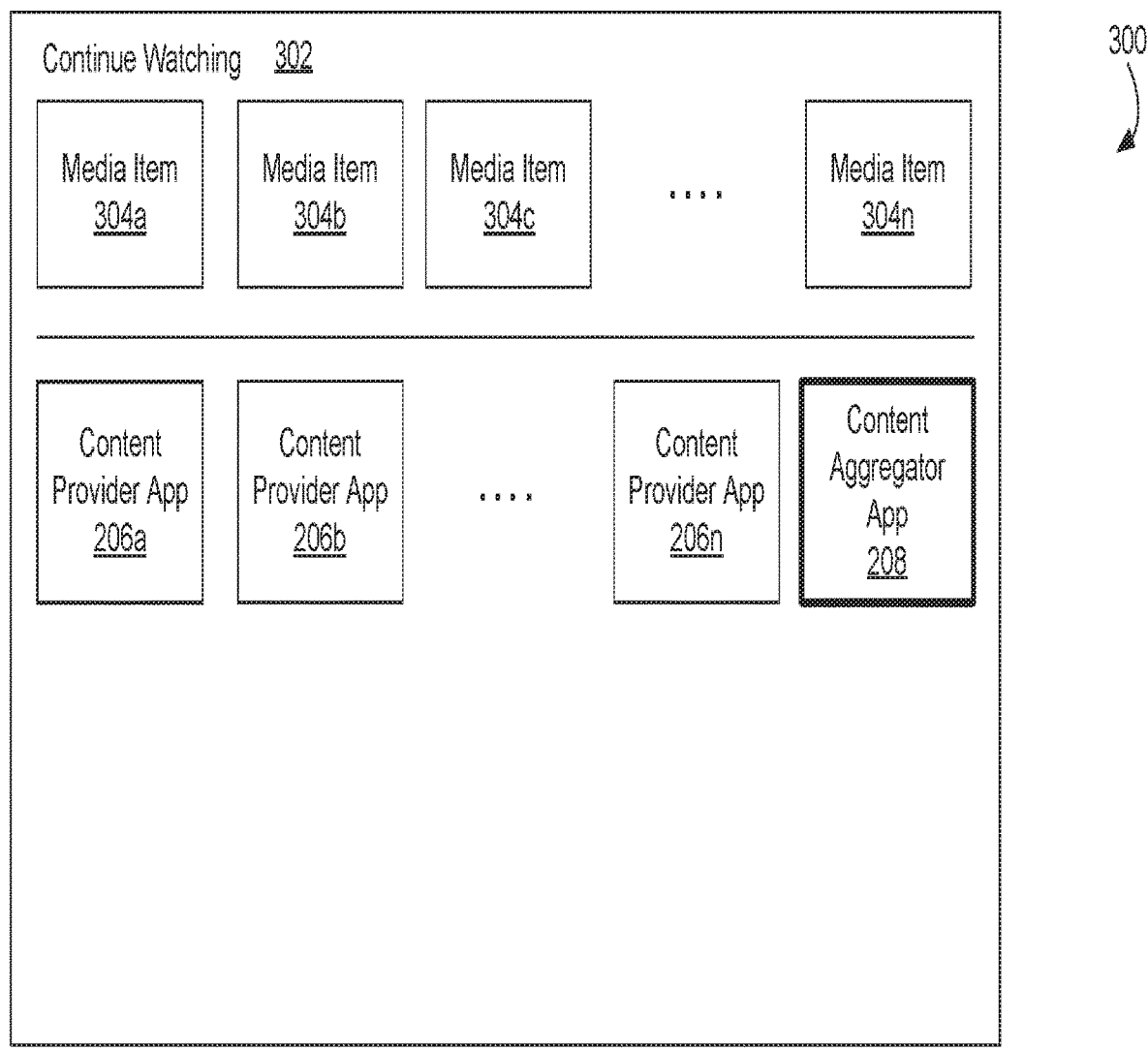
FIG. 3 illustrates an example graphical user interface presenting representations of media items associated with a content aggregator application.

FIG. 3 illustrates an example graphical user interface 300 presenting representations of media items associated with content aggregator application 108. For example, GUI 300 can be similar to GUI 200 except that the representations of media items 304a-n correspond to media items suggested by content aggregator application 108, as described further below. For example, a user can highlight graphical element 208 representing content aggregator application 108 to cause content aggregator application 108 to present in area 302 representations of media items 304a-n that content aggregator application 108 has determined that the user may wish to continue watching. The media items represented by media item representations 304a-n can be media items provided by different content providers, for example. Selection of one of the media item representations 304a-n can cause content aggregator application 108 to invoke the content provider application (e.g., content provider application 106b) corresponding to the content provider selected to provide the corresponding media item. For example, if content item 304a represents a media item provided by content provider application 106a, then content aggregator application 108 will invoke content provider application 106a and provide the media item identifier corresponding to media item 304a to content provider application 106a so that content provider application 106a can present media item 304a on the display of user device 102a. If the selected media item has been partially watched by the user, content aggregator 108 can send playback location data for the selected media item stored in the playback status data when the media item was last played for or presented to the user so that content provider application 106a can resume playback of the selected media item. For example, the playback location data can include a time index (e.g., 46:25 minutes, 28:43 minutes, etc.) indicating where playback of the media item was previously stopped. The playback location data can be a scene identifier or a chapter identifier indicating a scene or a chapter within the selected media item from which to resume playback.

Figure 4:
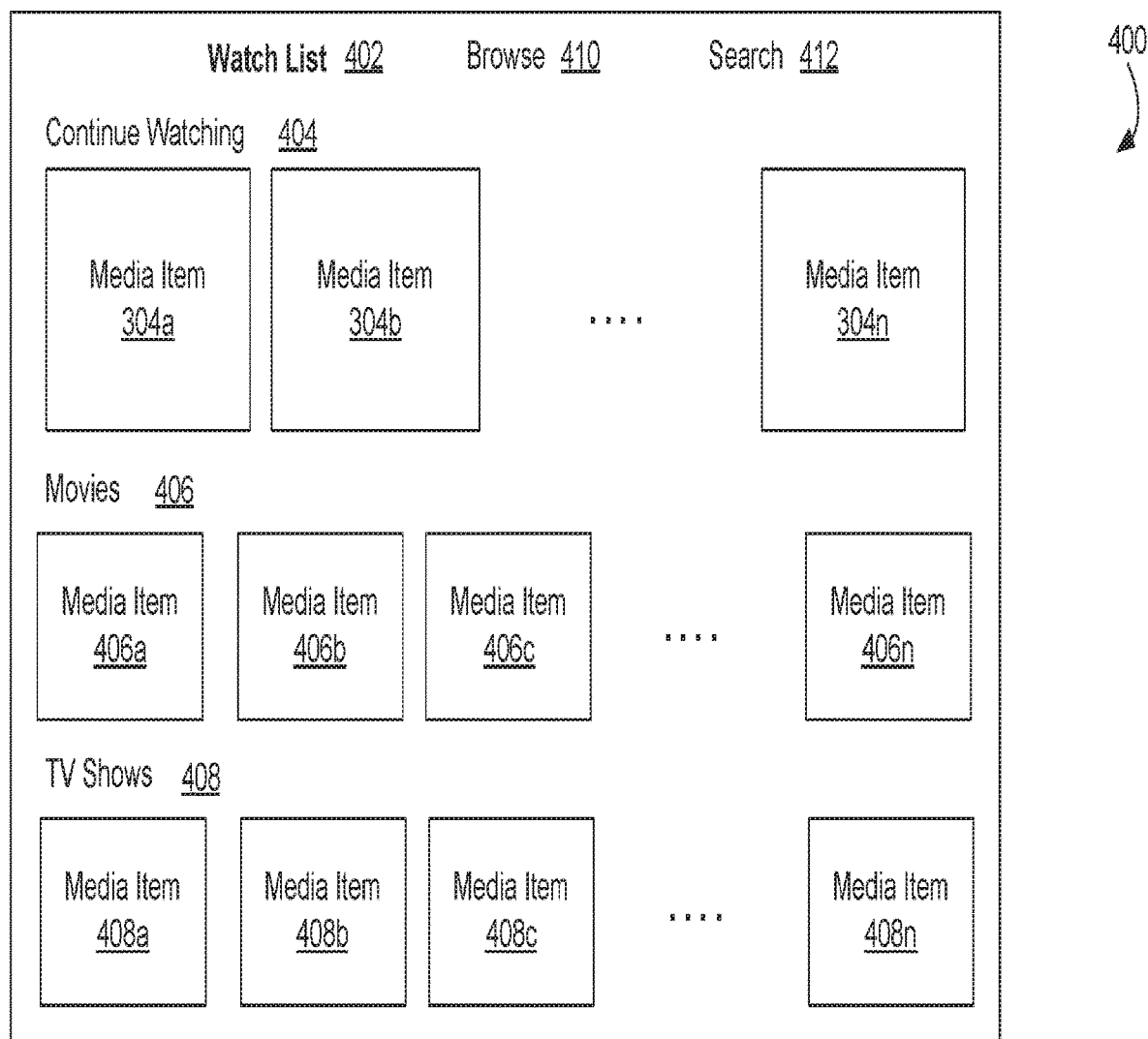
FIG. 4 illustrates an example graphical user interface presenting a universal watch list.

FIG. 4 illustrates an example graphical user interface 400 presenting a universal watch list. For example, graphical user interface 400 can be generated by content aggregator application 108 and presented on a display of user device 102a. GUI 400 can, for example, be the default user interface presented when a user invokes content aggregator application 108 by selecting graphical element 208 of FIG. 3. Alternatively, GUI 400 can be presented when the user selects graphical element 402 (e.g., a selectable text element "Watch List").

In some implementations, GUI 400 can present graphical representations of media items related to media items that the user has previously watched on user device 102a and/or other user devices. As described above, content aggregator application 108 can collect playback status data from the various content provider applications on user device 102a (and other user devices 102b, 102n, etc.). When GUI 400 is invoked, content aggregator application 108 can send a request to content aggregator server 114 for media items that the user may like to continue watching. Content aggregator server 114 can determine, based on the playback status data in user playback database 115, which media items the user has recently watch watched. Based on the recently watch media items, content aggregator server 114 can determine which media items the user may want to continue watching and/or which media items related to the recently watched media items the user may want to watch.

In some implementations, content aggregator server 114 can determine which media items the user may wish to continue watching. For example, user playback database 115 may include data identifying media items that the user partially watched. For example, the playback status data for a particular media item may indicate that the user stopped watching the particular media item after 30 minutes when the media item is 45 minutes long. When content aggregator server 114 determines that a media item (e.g., movie, television show, etc.) was partially watched by the user, content aggregator server 114 can determine that the user may wish to continue watching the media item and add the media item to a list or collection of continue watching media items.

Similarly, if the user has watched a media item (e.g., television show episode, movie, etc.) from a series of media items (e.g., television series, movie trilogy, movie series, etc.), content aggregator server 114 can identify the next media item in the series as a continue watching media item.

For example, if the user finished watching the television show episode identified in user playback database 115 (e.g., the current playback location corresponds to the total duration of the media item), content aggregator server 114 can determine the next episode in the television series based on the media item metadata in universal content database 116 and add the next episode to the collection of continue watching media items.

In some implementations, content aggregator server 114 can determine which content providers provide access to the media items in the continue watching collection of media items. For example, after identifying which media items the user may wish to continue watching, content aggregator server 114 can query universal content database 116 to determine which content providers have the media items. Content aggregator server 114 can, for example, send a media item identifier to universal content database 116 in the query to receive media item metadata for the identified media item associated with each content provider that provides the identified media item. Thus, when multiple content providers provide the identified media item, content aggregator server 114 can receive multiple metadata records reflecting the content provider metadata for the identified media item.

The content provider metadata can be different for each content provider. For example, one content provider may provide a high definition version of the identified media item while another content provider provides a low definition version of the media item. One content provider may charge a fee for viewing the identified media item while another content provider provides the identified media item at no cost. One content provider may require a subscription, while another content provider does not. On content provider may present advertisements during playback of the media item while other content providers do not. All of this content provider specific metadata for the identified content item can be included in the metadata received by content aggregator server 114 from universal content database 116.

In some implementations, after obtaining the content provider metadata for each media item in the collection of continue watching media items, content aggregator server 114 can determine which content provider should provide the media items identified in the collection of continue watching media items based on the content provider metadata. For example, for a particular media item identified in the content provider metadata, content aggregator server 114 can select a content provider based on a variety of criteria. The criteria can include cost. For example, content aggregator server 114 can select a content provider that provides the particular media item for the least cost. The criteria can include quality. For example, content aggregator server 114 can select a content provider that providers the best quality version of the particular media item. The criteria can include interruptions. For example, content aggregator server 114 can select a content provider that provides the fewest commercial interruptions. Content aggregator server 114 can select a content provider for presenting a media item based on one or a combination of the above criteria.

After selecting a content provider for the media item, content aggregator server 114 can send a collection of continue watching media items and selected content providers to content aggregator application 108 on user device 102a. For example, content aggregator server 114 can send the content provider-specific metadata for each of the media items in the collection of continue watching media items to content aggregator application 108. The metadata can include, among other things, an identifier for the content provider application, an identifier for the media item, the title of the media item, an image representing the media item, and/or any other metadata for presenting the media item on user device 102a and initiating playback of the media item through the corresponding media content provider.

Content aggregator application 108 can present a graphical element (e.g., graphical element 304a, 406a, and/or 408a) representing the media item on GUI 400. For example, content aggregator application 108 can present a graphical element 406a representing a media item from a selected content provider without indicating which content provider was selected to provide the media item. When the user selects the graphical element 406a, content aggregator application 108 can invoke the content provider application corresponding to the selected content provider for the media item and provide the media item identifier for the selected media item to the content provider application so that the invoked content provider application can playback the selected media item. Since the conditions under which different content providers provide media items may change over time, graphical element 406a may represent a media item provided by different content providers even though the actual media item may be the same media item. For example, graphical element 406a may represent the movie "Braveheart". The movie may be provided by different content providers (e.g., provider!, provider2). While graphical element 406a may continue to represent the movie "Braveheart" over time, the content provider application invoked to present the movie "Braveheart" may change over time based on the different costs, conditions, subscriptions, etc., associated with playing the movie from the different content providers. However, this change in source or content provider may be hidden from the user because the system described herein automatically selects a source or content provider for the user based on the criteria described above in order to give the user the best user experience possible.

In some implementations, GUI 400 can arrange content items by category. For example, GUI 400 can include a continue watching section 404 that includes graphical elements 304a-304n representing media items that the user started watching but did not finish. GUI 400 can include a movies section 404 that includes graphical elements 406a-406n representing movie media items related to media items that the user previously watched. For example, movies section 404 can include the next movie after a movie in a series of movies that the user watched. GUI 400 can include television shows section 408 that include graphical elements 408a-408n representing television media items related to media items that the user previously watched. For example, television shows section 408 can include the next episode of a television series after an episode that the user watched. The user can select any of these graphical elements to begin watching the corresponding media item. For example, when graphical element 408a is selected to playback a corresponding television show episode, content aggregator application 108 can invoke a content provider application corresponding to the selected content provider for the represented television show episode to begin watching the television show episode.

Figure 5:
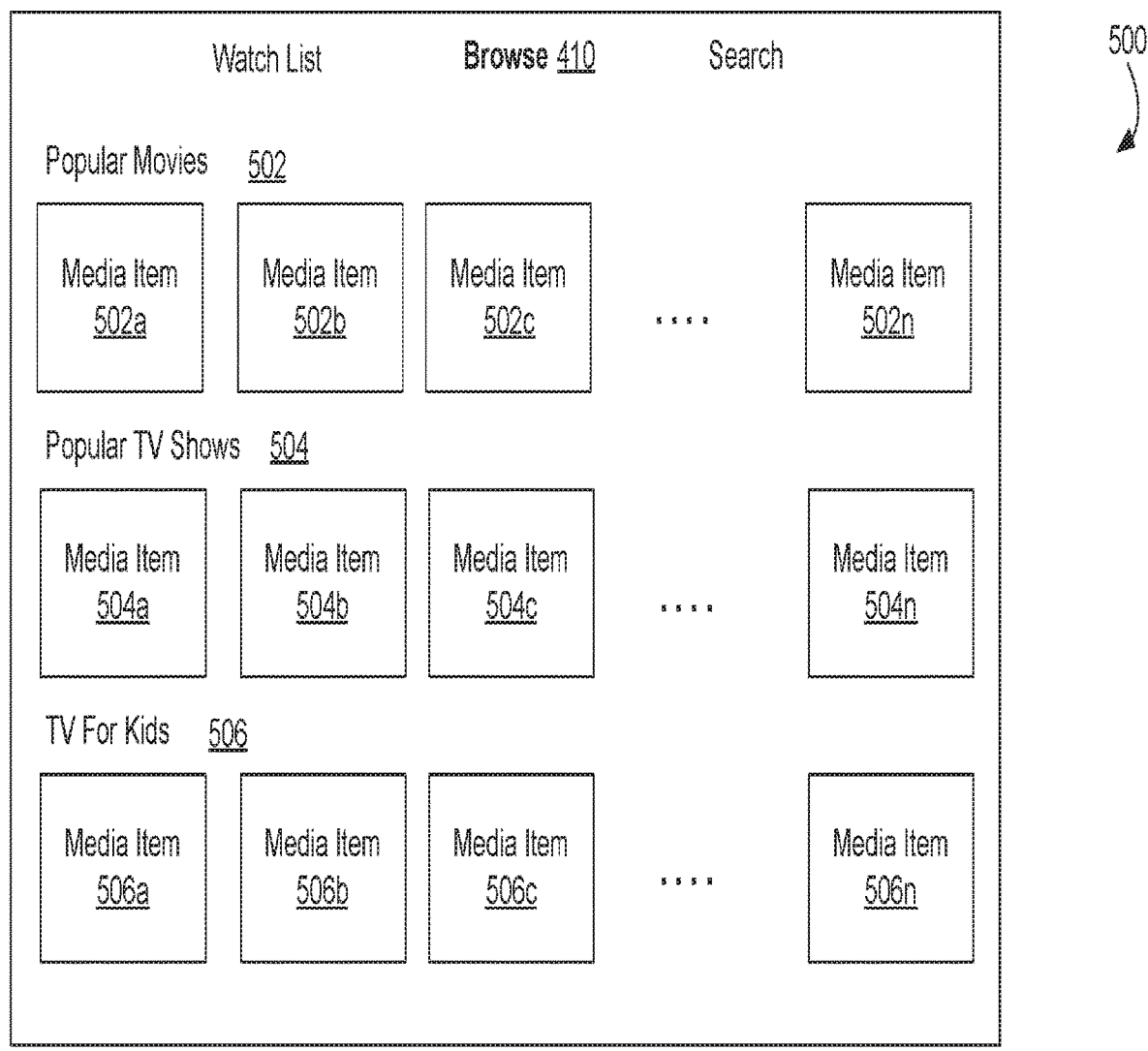
FIG. 5 illustrates an example graphical user interface presenting a universal browse list.

FIG. 5 illustrates an example graphical user interface 500 presenting a universal browse list. GUI 500 can be, for example, a universal browse list graphical user interface for displaying recommended media content choices to the user. For example, GUI 500 can be a browse list graphical user interface presented by content aggregator application 108 and displayed on user device 102a. In some implementations, GUI 500 can include graphical elements 502a-n, 504a-n, 506a-n. For example, graphical elements 502a-n, 504a-n, 506a-n can be images, icons, or other graphical objects representing media items that the user may wish to playback on user device 102a.

When GUI 500 is invoked (e.g., when the user selects graphical element 410), content aggregator application 108 can send a request to content aggregator server 114 for browse media items to present to the user. For example, the request can include the user identifier and/or device identifier of user device 102a. Upon receiving the request, content aggregator server 114 can determine, based on the media items identified in user playback database 115, which media items in universal content database 116 the user might like to watch. For example, content aggregator server 114 can find media items in universal content database 116 that have content (e.g., genre, actors, artists, subject matter, etc.) that is similar to the media items that the user has previously watched as indicated by the media playback data stored in user playback database 115.

Alternatively, content aggregator server 114 can determine media items to present to the user based on general popularity, age parameters, or other criteria. In some implementations, content aggregator server 114 will determine which media items to include in the media item browse list based on cost. For example, the media item browse list may include items that are free, are part of an active subscription, or that have already been paid for by the user. After determining which media items to include in the browse list, content aggregator server 114 can send the browse list (e.g., a collection of media item metadata) to content aggregator application 108. Like the continue watching watch list described with reference to FIG. 4, the browse list can include media items provided by different content providers and the content providers can be selected based on primary and secondary criteria described above.

In some implementations, universal browse list GUI 500 can include different regions for displaying different categories of media items. For example, GUI 500 can include region 502 that presents graphical elements 502a-n representing popular movies. GUI 500 can include region 502 that presents graphical elements 504a-n representing popular TV shows. GUI 500 can include region 502 that presents graphical elements 506a-n representing TV programs for children. These categories of media items are just examples and other categories of media items (e.g., SciFi, drama, new releases, etc.) can be presented on GUI 500. Similar to above, when the user selects a media item represented on GUI 500, content aggregator application 108 can invoke the content provider application corresponding to the content provider selected for presenting the user selected media item. Thus, different content provider applications may be invoked from GUI 500 depending on which media item is selected or when the media item is selected, as described above.

For example, when the user wishes to browse various content items (e.g., movie, television show, etc.), the user does not need to invoke each content provider application. Instead, the user can simply invoke content aggregator application 108 to see what the user previously watched, get recommendations for new content, resume viewing content that the user partially watched, or resume a series of content (e.g., the next episode in a TV series). Thus, the user can more quickly find media items that the user wishes to playback from across multiple different content providers by simply invoking content aggregator application 108 instead of having to invoke several different content provider applications which can be time consuming and burdensome to the user.

Figure 6:
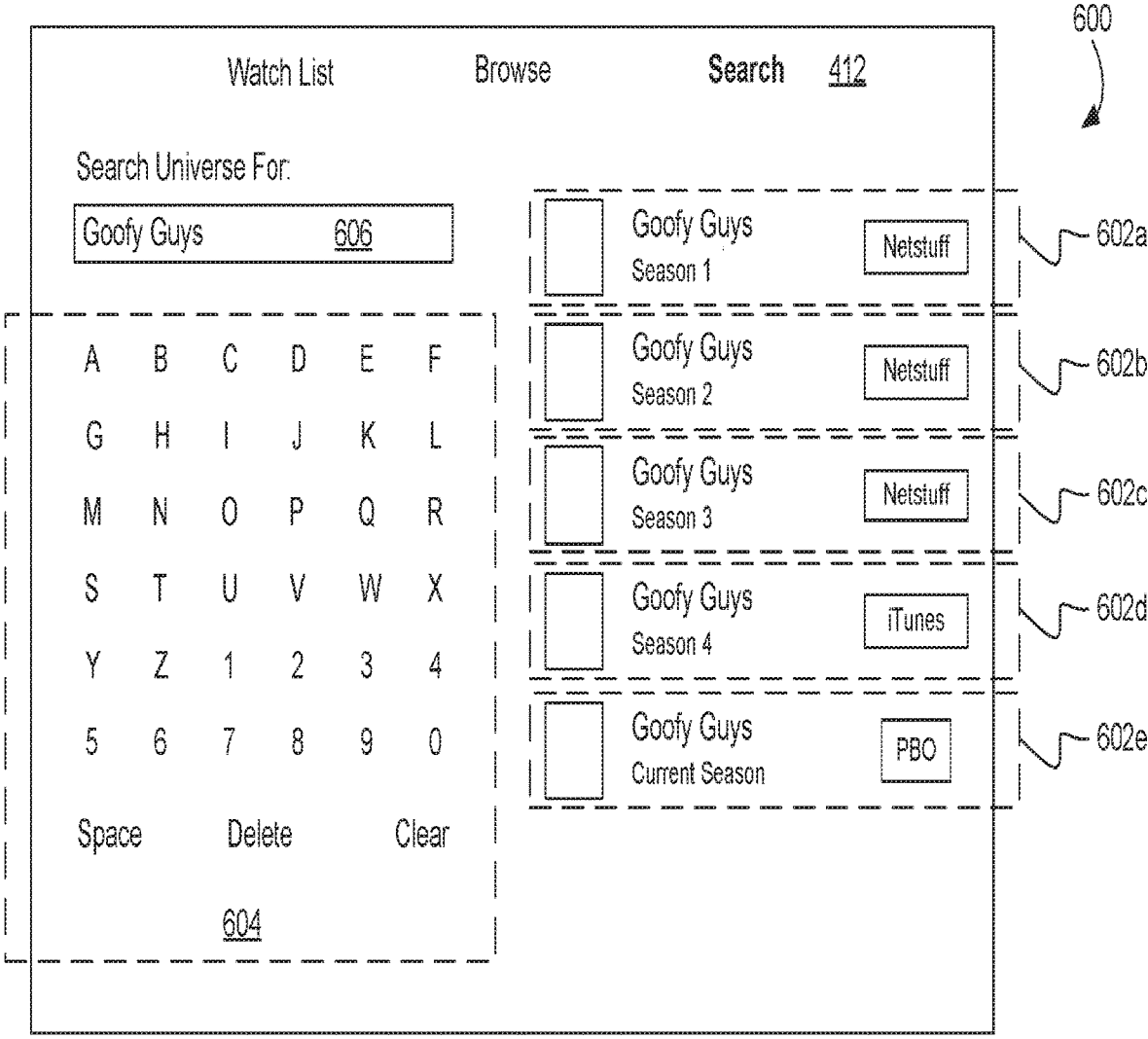
FIG. 6 illustrates an example graphical user interface for performing a universal search.

FIG. 6 illustrates an example graphical user interface 600 for performing a universal search. For example, graphical user interface 600 can present a search interface for receiving search parameter input, initiating a media item search across different content providers, and presenting media item search results to the user. For example, GUI 600 can be a graphical user interface presented content aggregator application 108 and displayed on user device 102a.

In some implementations, GUI 600 can include text input area 606 for the user to input search parameters (e.g., a search string) for searching for media items across multiple different content providers. For example, the user can select characters (e.g. letters and/or numbers) from text selection area 604 to define a search string. As the user selects or types each character, content aggregator application can send a search request to content aggregator server 114 that includes the current search string, the user identifier, and the device identifier for user device 102a. When content aggregator server 114 receives the search string, content aggregator server 114 can search universal content database 116 for media items that match the search string, filter the search results or select a media item provider for a matching media item based on the primary and/or secondary selection criteria, and send the matching media item metadata to content aggregator application 108.

In some implementations, GUI 600 can include graphical elements 602a-602e. For example, graphical elements 602a-602e can be images, icons, or other graphical objects representing the search results from a user initiated media item search. Graphical elements 602a-602e can, for example, represent a media item that matches the search parameters provided by the user and that corresponds to the content item provider selected based on the primary (e.g., cost) and secondary (e.g., quality, advertising, etc.) selection criteria described above. The user can select one of graphical elements 602a-602e to invoke the corresponding content provider application and playback the corresponding media item, as described above.

Thus, when the user wishes to search a particular content item (e.g., movie, television show, etc.), the user does not need to invoke each content provider application separately to perform the search. Instead, the user only need to invoke content aggregator application 108 to see what the user previously watched, get recommendations for new content, resume viewing content that the user partially watched, or resume a series of content (e.g., the next episode in a TV series). Thus, the user can avoid invoking several different content provider applications to perform a search which can be time consuming, burdensome, and costly to the user.

Example Processes

Figure 7:
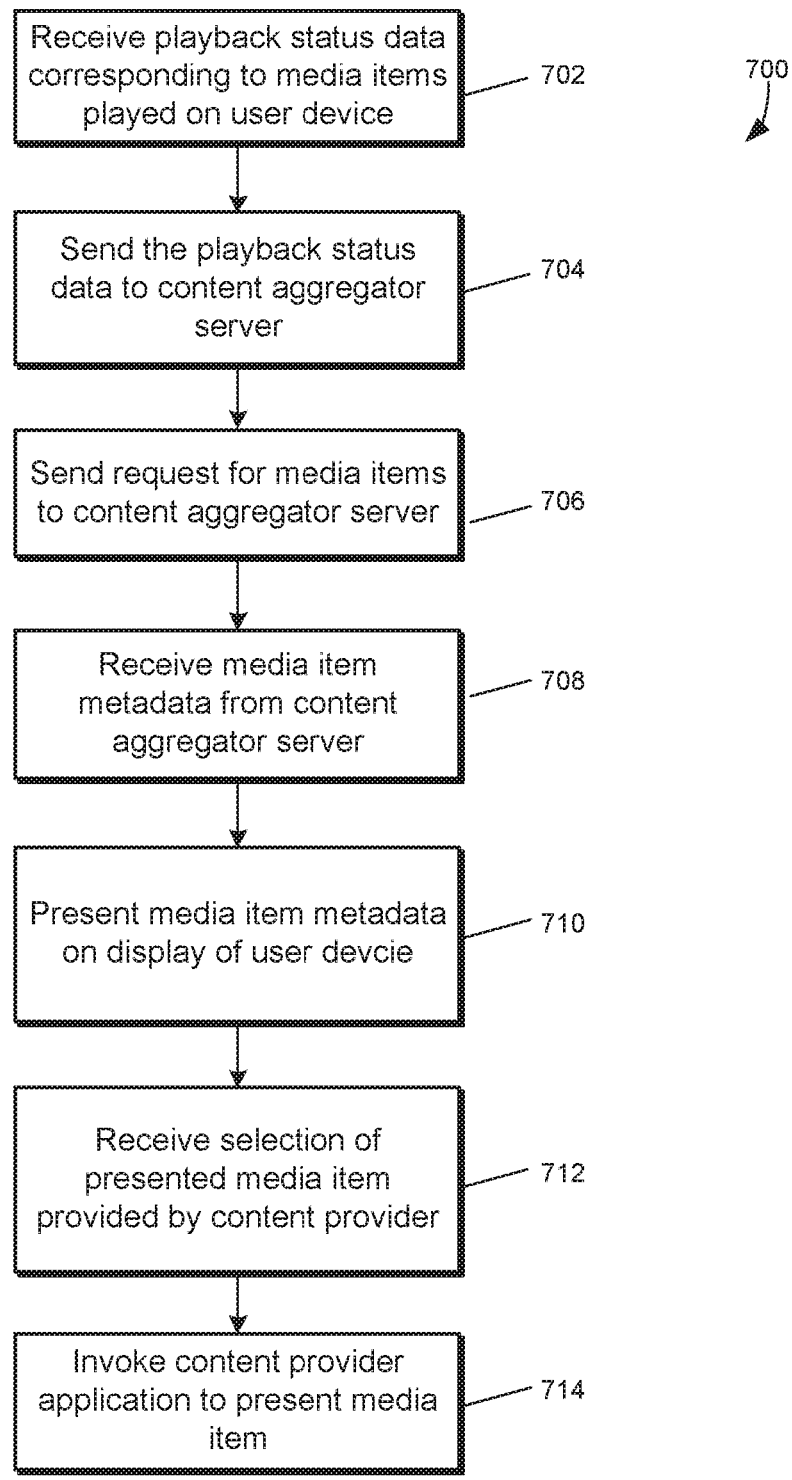
FIG. 7 is a flow diagram of an example process for presenting media items from across different media content providers on a user device.

FIG. 7 is a flow diagram of an example process 700 for presenting media items from across different media content providers on a user device. For example, a user device can implement process 700 to provide a centralized graphical user interface that allows the user of the user device to continue watching media items, browse media items, and/or search for media items across various content providers.

At step 702, user device 102a can receive playback status data corresponding to media items played on user device 102a. For example, when the user invokes a content provider application on user device 102a to present a media item, the content provider application can send playback status data to content aggregator application 108 (e.g., a user application, daemon, service, etc.) on user device 102a. The content provider application can send the playback status data periodically or in response to a detected event (e.g., stopping playback, pausing playback, completing playback of the media item, etc.).

At step 704, user device 102a can send the playback status data to a content aggregator server. For example, user device 102a can send playback status data that includes an identifier for the content provider that provided the played media item, an identifier for the played media item, a user identifier (e.g., email address, user name, etc.), a device identifier, and/or a playback position for the media item.

At step 706, user device 102a can send a request for media items to the content aggregator server. For example, when content aggregator application 108 is invoked by a user, content aggregator application 108 can present GUis for continuing to watch previously watched media items (e.g., the universal watch list), browsing media items (e.g., the universal browse list), and/or searching for media items (e.g., universal search), as described above. For example, when the user selects to view the universal watch list (e.g., GUI 400), content aggregator application 108 can send a request to content aggregator server 114 requesting media items that the user might want to continue watching. When the user selects to view the universal browse list (e.g., GUI 500), content aggregator application 108 can send a request to content aggregator server 114 requesting media items that the user might want to browse. When the user selects to view the universal search UI (e.g., GUI 600), content aggregator application 108 can send a request to content aggregator server 114 requesting media item search results that match a search query (e.g., search string).

At step 708, user device 102a can receive media item metadata corresponding to media items provided by multiple different content providers. For example, user device 102a can receive media item metadata that describes media items that the user may wish to continue watching, media items that the user may wish to browse, and/or media items that match search parameters provided by the user. The metadata for each media item may indicate a content provider selected to present the media item. Different media items can indicate different content providers for presenting the media item.

At step 710, user device 102a can present media item metadata on a display of user device 102a. For example, content aggregator application 108 can present representations of the media items identified in the media item metadata received from content aggregator server 114. Content aggregator application can present the media item representations in the universal watch list UI (e.g., GUI 400), universal browse list UI (e.g., GUI 500), and/or universal search UI (e.g., GUI 600), as described above. In some implementations, if the user moves a cursor (e.g., pointer, selector, touch input, finger, etc.) over a representation of a media item, the content aggregator application 108 can change the representation of the media item to present an image representing a scene or position in the media item where playback of the media item will resume if the media item is selected for playback.

Figure 8:
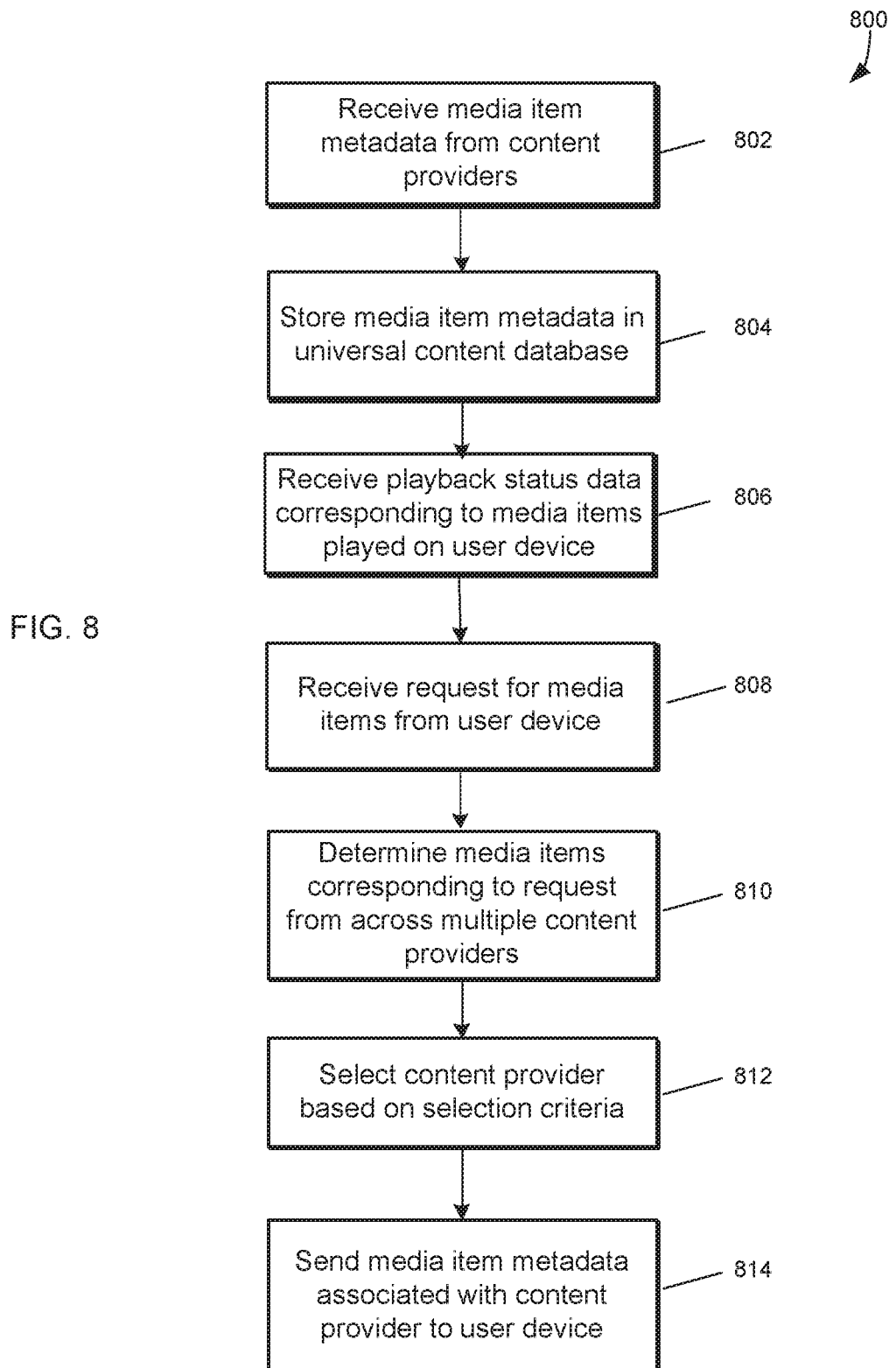
FIG. 8 is a flow diagram of an example process for selecting media content providers for presenting media items on a user device.

At step 712, user device 102a can receive a selection of a presented media item provided by a content provider. For example, the user can select a representation of a media item provided by a content provider to cause content aggregator application 108 to invoke to corresponding content provider application at step 714. For example, content aggregator application 108 can invoke the corresponding content provider application and provide the media item identifier for the selected media item to the content provider application so that the content provider application can present the selected media item. [0064] FIG. 8 is a flow diagram of an example process 800 for selecting media content providers for presenting media items on a user device. For example, process 800 can be performed by content aggregator server 114 to determine media items to present to a user and select content providers for presenting the determined media items so that the user can view and playback media items from various media content providers without having to invoke different content provider applications.

At step 802, content aggregator server 114 can receive media item metadata from various content providers. For example, the media item metadata can describe the media items provided by each of the various content providers. The media item metadata for each media item can include a content provider identifier, a media item identifier, an image representing the media item, the title of the media item and/or other metadata (e.g., genre, length, rating, artists, actors, etc.).

At step 804, content aggregator server 114 can store the media item metadata received from the various content providers in universal content database 116. For example, universal content database 116 can store media item metadata received from many different content providers.

At step 806, content aggregator server 114 can receive playback status data corresponding to media items played or presented by user device 102*a*. For example, content aggregator server 114 can receive playback status data that describes a media item being played at user device 102*a* and a current playback location within the played media item. The playback status data can include a content provider identifier, a media item identifier, the current playback location within the media item, and/or other metadata for the media item. When playback status data is received, content aggregator server 114 can store the playback status data in user playback database 115.

At step 808, content aggregator server 114 can receive a request for media items from user device 102*a*. For example, content aggregator server 114 can receive a universal watch list request requesting media items that the user may wish to continue watching. Content aggregator server 114 can receive a universal browse list request requesting media items that the user may wish to browse. Content aggregator server 114 can receive a universal search request requesting that content aggregator server 114 perform a media item search based on user specified search parameters. Each request can include a user identifier and/or a device identifier.

At step 810, content aggregator server 114 can determine media items corresponding to the received request from across multiple content providers. In some implementations, content aggregator server 114 can generate a universal watch list. For example, when content aggregator server 114 receives a universal watch list request from user device 102*a*, content aggregator server 114 can determine which media items the user of user device 102*a* has recently watched. Content aggregator server 114 can determine which recently watched media items the user completed and which recently watched media items the user stopped in the middle of playback. Content aggregator server 114 can add the interrupted media items (e.g., the media items the user did not complete) to the watch list. For the completed media items, content aggregator server 114 can determine, based on the media item metadata in universal content database 116, whether the completed media item is one of a series of media items. If the completed media item is one of a series of media items, content aggregator server 114 can add the next media item in the series to the watch list.

In some implementations, content aggregator server 114 can generate a universal browse list. For example, when content aggregator server 114 receives a universal browse list request from user device 102*a*, content aggregator server 114 can determine which media items the user of user device 102*a* may like to watch. Content aggregator server 114 can, for example, determine which media items the user may like to watch based on the user's media item selection history as represented by the entries in user playback database 115. For example, content aggregator server 114 can determine which genres, actors, directors, etc., are associated with media items the user typically selects and find similar media items in universal content database 116. Alternatively, content aggregator server 114 can find media items that are generally popular with users, or with kids, etc. After identifying the media items for the browse list, content aggregator 114 can add the media items to the browse list.

In some implementations, content aggregator server 114 can generate universal search results. For example, when content aggregator server 114 receives a universal search request from user device 102*a*, content aggregator server 114 can determine which media items in universal content database 116 match the search parameters in the search request. After identifying the media items for the search results, content aggregator 114 can add the media items to the search results.

At step 812, content aggregator server 114 can select a content provider for each media item based on selection criteria. In some implementations, content aggregator server 114 can determine which content providers provide access to the media items in the universal watch list, the universal browse list, and/or the search results. For example, when a media item is added to the watch list, browse list, or search results, content aggregator 114 can search universal content database 116 to determine which content providers provide access to the media item. Content aggregator server 114 can then select a content provider for playing back the media item based on primary and secondary criteria, as described above.

At step 814, content aggregator server 114 can send media item metadata associated with the selected content provider to the user device. For example, after content aggregator server 114 selects a content provider (e.g., based on cost, subscriptions, quality, advertisements, etc.) for a media item in the watch list, browse list, or search results, content aggregator server 114 can add the content provider specific metadata for the media item to the watch list, browse list, or search results. The content provider specific metadata can include a content provider identifier and a media item identifier that can be used to invoke the corresponding content provider application to playback the identified media item. For example, a different content provider can be selected for each media item in the watch list, browse list, or search results. After selecting the content provider for each media item and adding the selected content provider metadata, content aggregator 114 can send the watch list, browse list, or search results to the content aggregator application 108 on user device 102*a*.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 9:
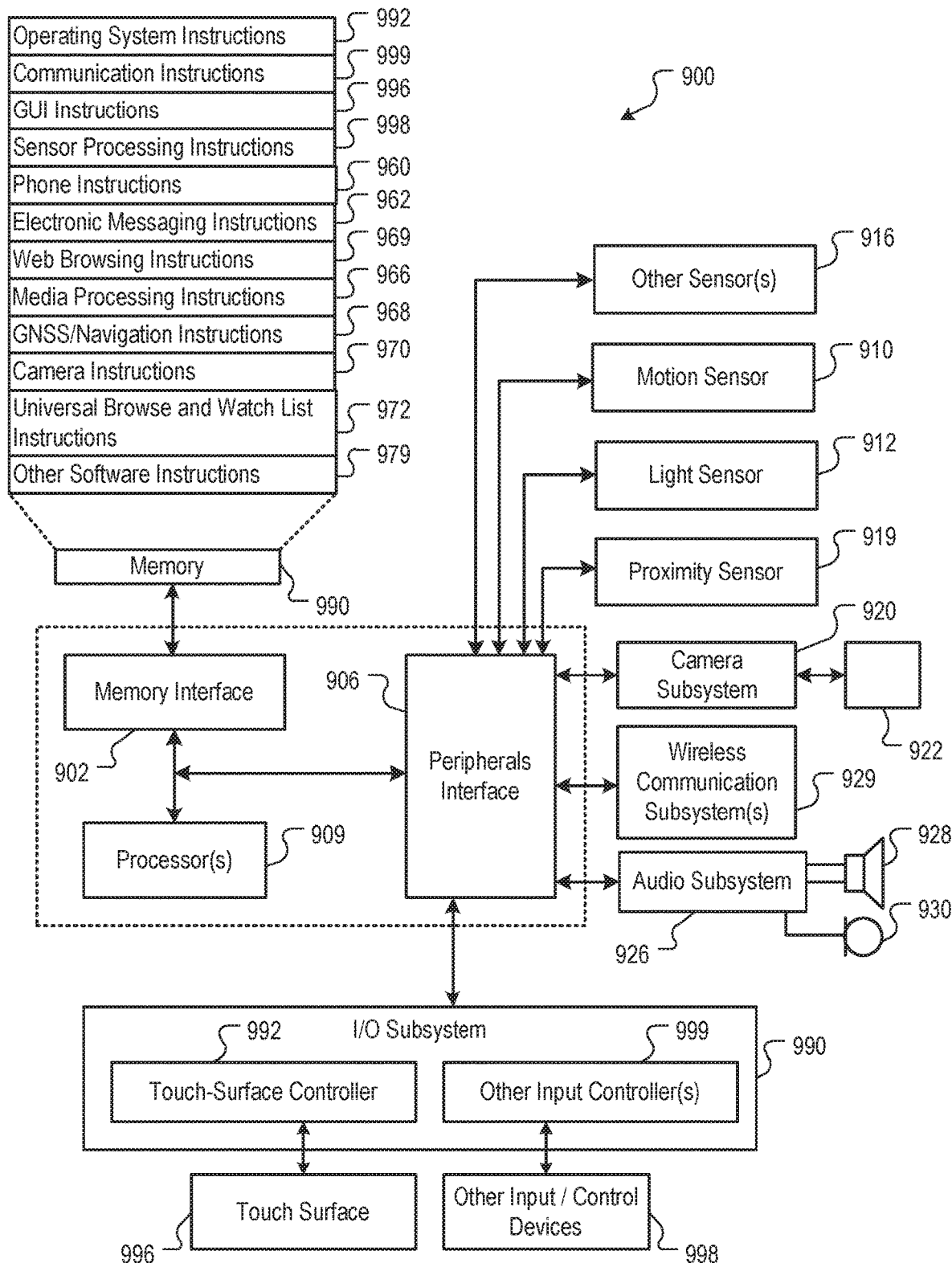
FIG. 9 is a block diagram of an example system architecture implementing the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voice printing and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the universal browse and watch list features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store other software instructions 972 to facilitate other processes and functions, such as the universal browse and watch list processes and functions as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Although not depicted, device 900 can include provision of electricity via a battery, solar cells for providing electricity, motion-to-electricity converters, and/or ACIDC conversion.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including m one or more signal processing and/or application specific integrated circuits.

What is claimed is:

1. A tangible, non-transitory, computer-readable medium, comprising computer-readable instructions that, when executed by one or more processors of a computer, cause the computer to:
   store, in an operating system of the computer, an indication of active content provider subscriptions associated with the computer, a user of the computer, or both;
   for at least one of the active content provider subscriptions, collect and store, in the operating system, authentication information;
   invoke, via the operating system, a content provider application associated with the at least one of the active content provider subscriptions; and
   supply, from the operating system, the stored authentication information to the content provider application for automatic login.

2. The tangible, non-transitory, computer-readable medium of claim 1, wherein the authentication information comprises an access token for the content provider application.

3. The tangible, non-transitory, computer-readable medium of claim 1, wherein the authentication information comprises an account identifier, a password, or both.

4. The tangible, non-transitory, computer-readable medium of claim 1, comprising computer-readable instructions that, when executed by the one or more processors of a computer, cause the computer to:
   collect the authentication information via user input in a graphical user interface of the operating system.

5. The tangible, non-transitory, computer-readable medium of claim 1, wherein the at least one of the active content provider subscriptions comprises at least two active content provider subscriptions, each having an independent corresponding content provider application.

6. The tangible, non-transitory, computer-readable medium of claim 1, comprising computer-readable instructions that, when executed by the one or more processors of a computer, cause the computer to:
   receive, from an application, a request for the indication of the active content provider subscriptions; and
   in response to the request, provide the indication of the active content provider subscriptions to the application.

7. The tangible, non-transitory, computer-readable medium of claim 6, wherein the application comprises a content aggregation application.

8. The tangible, non-transitory, computer-readable medium of claim 1, comprising computer-readable instructions that, when executed by one or more processors of a computer, cause the computer to:
   invoke the content provider application via a content aggregation application executed on the operating system.

9. The tangible, non-transitory, computer-readable medium of claim 1, comprising computer-readable instructions that, when executed by one or more processors of a computer, cause the computer to:

receive an opt in indication, an opt out indication, or both for supplying the stored authentication information to the content provider application; and supply the stored authentication information only to content provider applications that have an associated opt in indication, do not have an associated opt out indication, or both.

10. The tangible, non-transitory, computer-readable medium of claim 1, wherein at least one of the active content provider subscriptions provides access to content from a plurality of content provider applications and the authentication information is common authentication information used for the plurality of content provider applications to access the content from the plurality of content provider applications.

11. A computer-implemented method, comprising:

storing, in an operating system of the computer, an indication of active content provider subscriptions associated with the computer, a user of the computer, or both;

for at least one of the active content provider subscriptions, collecting and storing, in the operating system, authentication information;

invoking, via the operating system, a content provider application associated with the at least one of the active content provider subscriptions; and supplying, from the operating system, the stored authentication information to the content provider application for automatic login.

12. The computer-implemented method of claim 11, comprising:

collecting the authentication information via user input in a graphical user interface of the operating system.

13. The computer-implemented method of claim 11, comprising:

receiving, from an application, a request for the indication of the active content provider subscriptions; and in response to the request, providing the indication of the active content provider subscriptions to the application.

14. The computer-implemented method of claim 11, comprising:

invoking the content provider application via a content aggregation application executed on the operating system.

15. The computer-implemented method of claim 11, comprising:

receive an opt in indication, an opt out indication, or both for supplying the stored authentication information to the content provider application; and supply the stored authentication information only to content provider applications that have an associated opt in indication, do not have an associated opt out indication, or both.

16. The computer-implemented method of claim 11, wherein at least one of the active content provider subscriptions provides access to content from a plurality of content provider applications and the authentication information is common authentication information used for the plurality of content provider applications to access the content from the plurality of content provider applications.

17. An electronic device, comprising:

one or more processors;

a tangible, non-transitory, computer-readable medium, comprising an operating system that, when executed by the one or more processors, cause the electronic device to:

perform basic system services and hardware dependent tasks; and store, in the operating system of the computer, an indication of active content provider subscriptions associated with the computer, a user of the computer, or both;

for at least one of the active content provider subscriptions, collect and store, in the operating system, authentication information;

invoke, via the operating system, a content provider application associated with the at least one of the active content provider subscriptions; and supply, from the operating system, the stored authentication information to the content provider application for automatic login.

18. The electronic device of claim 17, comprising an input/output subsystem for providing content from the content provider application to an external electronic device.

19. The electronic device of claim 17, wherein at least one of the active content provider subscriptions provides access to content from a plurality of content provider applications and the authentication information is common authentication information used for the plurality of content provider applications to access the content from the plurality of content provider applications.

20. The electronic device of claim 17, wherein the operating system, when executed by the one or more processors, cause the electronic device to:

receive, from an application, a request for the indication of the active content provider subscriptions; and in response to the request, provide the indication of the active content provider subscriptions to the application.

* * * * *